Figure 1:
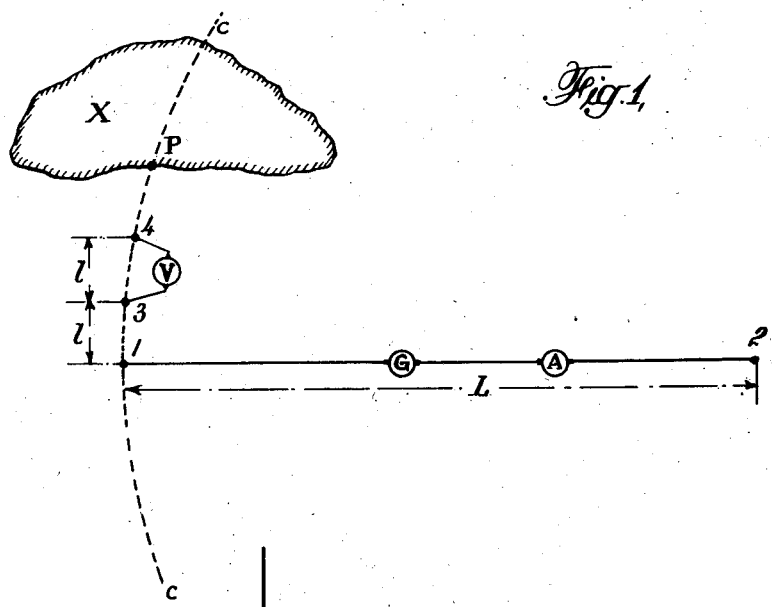

Oct. 25, 1932.                K. SUNDBERG                1,884,364

METHOD OF MAPPING SUBSURFACE STRUCTURES

Filed May 11, 1928

INVENTOR
Karl Sundberg
BY
ATTORNEYS

Patented Oct. 25, 1932

1,884,364

UNITED STATES PATENT OFFICE

KARL SUNDBERG, OF HOUSTON, TEXAS, ASSIGNOR TO AKTIEBOLAGET ELEKTRISK MALMLETNING, OF STOCKHOLM, SWEDEN, A CORPORATION OF SWEDEN

METHOD OF MAPPING SUBSURFACE STRUCTURES

Application filed May 11, 1928. Serial No. 276,849.

This invention relates to electrical methods of mapping subsurface structures. More particularly, the invention relates to the so-called potential method and has for its object the provision of an improved form of potential method for mapping subsurface structures.

Because the electrical conductivity of different soils and rocks varies considerably it is possible to map a subsurface structure by determining at various points on the surface the depth to a layer having a certain electrical conductivity. Such electrical mapping of a subsurface layer may be carried out by several methods of which the potential method is one.

According to the potential method, a current is caused to flow through the ground between two points and the potential difference between two other points located in a straight line joining the first two points is measured. Ordinarily, an arrangement of four metal electrodes driven into the ground, preferably in a straight line and equidistant from each other, is employed. The leads from a direct or low frequency current generator are connected through an ammeter to the two outermost electrodes and a voltmeter is connected across the two inner electrodes. If, in a particular region being explored, a homogeneous layer of infinite thickness be assumed to be beneath the surface, the specific resistance of such a layer may be determined by the relation $$\rho = 2\pi l \frac{W}{I}$$

where $I$ = current indicated by the ammeter
$W$ = voltage indicated by the voltmeter
$l$ = distance between the electrodes In order to show the derivation of this formula, the outer electrodes may be regarded as 1 and 2, respectively; the inner electrodes as 3 and 4, respectively. They would thus appear in succession as 1, 3, 4 and 2; the distance between adjacent electrodes being equal. This arrangement may be graphically illustrated as follows:

The potential at a point 3 on the surface of the conductive medium, where electrode 3 is located, still assuming that a homogeneous layer of infinite thickness and specific resistance exists in the region explored, is given by the well known formula:

$$(1) \quad \rho_3 = \frac{I\rho}{4\pi}\left\{\frac{1}{r_{31}} - \frac{1}{r_{32}}\right\}$$

where
  3 = the potential at point 3
  $I$ = current indicated by ammeter A
  $r_{31}$ = distance between points 3 and 1
  $r_{32}$ = distance between points 3 and 2

$$(2) \quad \rho_4 = \frac{I\rho}{4\pi}\left\{\frac{1}{r_{41}} - \frac{1}{r_{42}}\right\}$$

where
  $\rho_4$ = the potential of point 4
  $r_{41}$ = distance between points 4 and 1
  $r_{42}$ = distance between points 4 and 2

Connecting the points 3 and 4 by means of a high ohmic voltmeter, and measuring the potential drop $W$, I have the equation:

$$W = \rho_3 - \rho_4 = \frac{I\rho}{4\pi}\left[\frac{1}{r_{41}} - \frac{1}{r_{31}} - \left\{\frac{1}{r_{42}} - \frac{1}{r_{32}}\right\}\right]$$

and are able to determine the specific resistivity $$(3) \quad \rho = \frac{4\pi}{\dfrac{1}{r_{41}} - \dfrac{1}{r_{31}} - \left\{\dfrac{1}{r_{42}} - \dfrac{1}{r_{32}}\right\}} \cdot \frac{W}{I}$$

If the points are equidistant on a straight line and if the distance between the points is $l$, this formula changes to $$(4) \quad \rho = 2\pi l \frac{W}{I}$$

However, a single homogeneous layer of infinite thickness is seldom encountered in nature. Normally, I have to deal with a series of layers of different conductivity and thickness. Accordingly, in practice it is customary to presuppose the presence of a second layer at a depth such as $h$ and to take a plurality of readings of $W$ and $I$ for different values of $l$ I will notice that the resulting resistivity varies with $l$. From a substitution of these various values in the above equation it is found that the value of $\rho$ varies with $l$. If readings are begun with very small values of $l$ and gradually increased, more or less constant values of $\rho$ will be obtained only for small values of $l$ until the total distance between the two outer electrodes becomes greater than the depth $h$ to the assumed second layer. For larger values of $l$ the value of $\rho$ will decrease or increase, depending upon whether the specific resistance of the second layer, or lower layers is less or greater, respectively, than that of the upper layers or that obtained under the assumption of but one existing layer.

The reason for this variation is that the penetration of the current flowing between the outer electrodes is deeper the greater the distance $l$. For distances less than $h$ the current distribution in the topmost layer will be the same as if this layer were infinitely thick and therefore the value of $\rho$ determined for such values of $l$ will be practically equal to the specific resistance, which I may call $\rho_1$ for purposes of simplicity, of the top layer. If the distance $l$ is increased, the current distribution in the top layer will be affected more and more by the second layer, resulting in lesser values of $\rho$ if the specific resistance $\rho_2$ of the second layer is less than $\rho_1$ and greater values if $\rho_2$ is greater than $\rho_1$.

From the turning point in the value of $l$ beyond which the value of $\rho$ either increases or decreases it is possible to determine the value of $h$ and calculate the value of $\rho_2$ from the form of a curve plotted from the values of $\rho$, and, also, to predict the presence of a third layer of still different conductivity. This latter interpretation is, of course, quite complicated and is dependent to a great extent upon long experience in the practice of the potential method of mapping subsurface structures. At any rate, it is usually possible to determine at least the thickness of both the first and second layers with fair accuracy and from these determinations at a number of points to draw contour lines of the subsurface structure of the region.

In carrying out such investigations, however, when using the equidistant potential drop method two serious difficulties are encountered, one being due to the fact that the measurements give only average values of the thickness $h$. Thus, in the case of a faulted inclined layer with the electrodes located on opposite sides of the fault, the measurements obtained might give no indication of the fault.

A still more serious objection is the fact that the conductivity of the layer closest to the surface, the earth cover, varies very much within comparatively short distances. In carrying out actual measurements, this variation sometimes makes the accurate interpretation of the results practically impossible.

Accordingly, I have devised an improved form of potential method wherein these difficulties are eliminated, or, at least, made considerably less serious.

In accordance with my method, the outer electrodes are maintained at a fixed great distance from each other throughout the investigation of a given region, and the two inner electrodes are spotted at various points on the arc of a circle passing through or adjacent to one of the fixed electrodes and having the other fixed electrode as a center.

Figure 2:
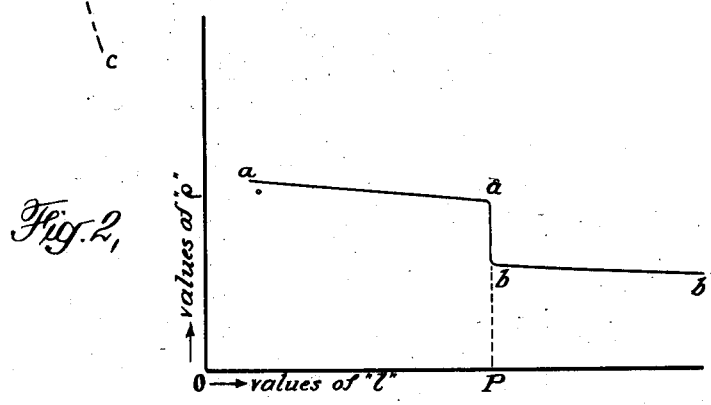
Figure 3:
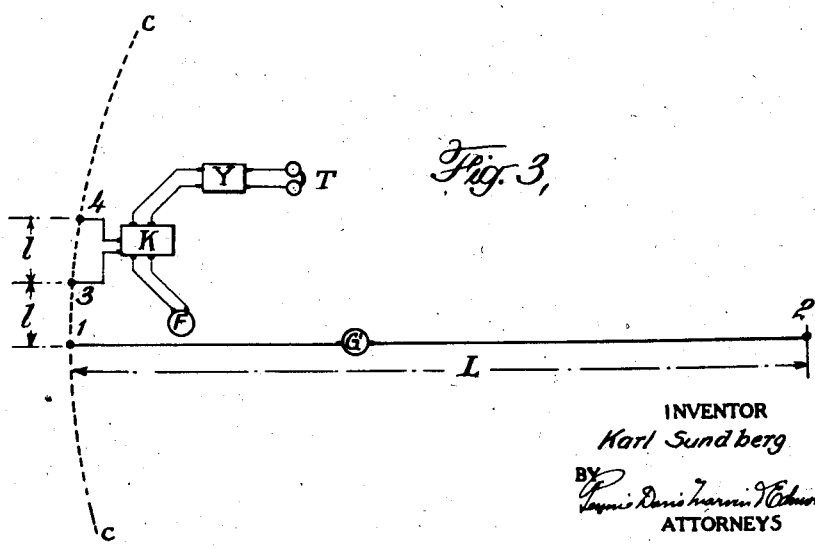

In order that my method may be better understood, reference is made to the accompanying drawing wherein:

Fig. 1 is a diagram showing the arrangement of the electrodes in accordance with the invention, Fig. 2 is a chart showing plotted results of readings taken in accordance with the invention, Fig. 3 is a diagram showing the use of modified apparatus in accordance with the invention.

Considering Fig. 1 more in detail, electrodes 1 and 2 are located at a fixed great distance L which is maintained through the investigation, and are connected by leads to a current generator G having an ammeter A in circuit. Two other electrodes 3 and 4 connected to a voltmeter V are adapted to be moved from point to point on the arc $c$—$c$ of a circle drawn through the electrode 1 with 2 as a center.

From readings of voltage and current taken with the apparatus arranged in the manner shown in Fig. 1, the specific resistance of an assumed homogeneous layer of infinite thickness can be determined by the relation;

$$\rho = 4\pi l \frac{W}{I}$$

where $l$ = the distance shown in Fig. 1
$W$ = voltage indicated by the voltmeter V
$I$ = current indicated by the ammeter A This formula is obtained by making suitable substitutions, in formula (3) given above. Thus, substituting $r_{31}=l$; and $r_{41}=2l$; and noting that $r_{42}=r_{32}$, I have $$(5) \quad \rho = 4\pi l \frac{W}{I}$$

For different values of $l$, different values of $\rho$ will be obtained; the value of $\rho$ varying in much the same manner as in the caluculation of readings made in connection with the known potential method previously described. That is, up to a certain value of $l$ the calculated value of $\rho$ will remain more or less constant, and beyond such value of $l$ the value of $\rho$ will vary in a manner dependent upon whether the value $\rho_2$ of a second layer is greater or less than the value $\rho_1$ of the topmost layer.

In general, results similar to those obtained by the potential method at present in use are obtained, and from the plotted values of $\rho$ corresponding interpretations can be made in the manner described in preceding paragraphs. The results obtained by my improved method are, however, more accurate and can be obtained with greater ease than by the known potential method.

A particular advantage of the arrangement of electrodes in the manner described and shown in Fig. 1 arises out of the fact that the potential difference along the circular arc $c$—$c$ is practically determined only by the conditions, such as conductivity and thickness, at the electrode 1 and is quite independent of the conditions at the electrode 2. The reason for this advantage is evident from formulae 1 and 2. The potential caused by the electrode 2 in point 3 and 4 is the same due to the fact that distance $r_{32}$ equals distance $r_{42}$. In other words measuring the potential drop 3, 4 along the circular arc $c$—$c$ eliminates practically any influence of electrode 2. The results obtained are therefore substantially true values and not merely average values.

This is strictly true if the conducting layers are horizontal because then the potential difference due to electrode 2 alone between two points, such as 3 and 4, located at the same distance from 2 is zero. The observed potential difference between the two points indicated is therefore due only to the electrode 1. A determination thus gives values of thickness and conductivity directly at the point 1. However, even though the layers deviate from the horizontal the values obtained will not be appreciably in error because the potential differences along the line $c$—$c$ due to the electrode 2 will be very small compared with those due to the electrode 1, particularly if the distance L is large compared with the largest value of $l$ used.

Another advantage of my improved method is that the electrodes 1 and 2 are not moved during the investigation of a given region. The influence of irregularities in surface conditions is consequently avoided. Strictly speaking, such irregularities will affect the values of W, but it is possible to take these variations into consideration by taking measurements of W at short intervals along the entire arc $c$—$c$.

Thus, assuming for instance that an area X in Fig. 1 is wet or for some other reason more conductive than the surrounding area, a sudden drop in potential at a point P will be encountered, and further measurements when plotted will appear as shown in Fig. 2. By interpreting the measurements with respect to deeper conducting layers, this variation at the points observed can be taken into consideration by treating the portions $a$—$a$ and $b$—$b$ of the curve of Fig. 2 separately, avoiding letting differences in potential between one point in section $a$—$a$ and another in section $b$—$b$ being used in the equation for obtaining the value of $\rho$.

In some instances it may be desirable to employ alternating current in order to avoid polarization of the electrodes. When current of this form is used the compensator arrangement described in my United States application Serial No. 168,527 filed February 16, 1927 and shown in Fig. 3 is employed. The arrangement shown comprises a feeding coil F, in which a known voltage is induced, and a compensator K in which part of this voltage is used to compensate and determine the potential difference between the two electrodes 3 and 4 as well as its phase. As an indicator, a telephone T together with an amplifier Y is used to obtain readings. Since this arrangement gives the potential difference per unit of current flowing through the wire circuit 1—G'—2, that is, the ratio $\frac{W}{I}$, no measurement of the current I is necessary, thereby considerably simplifying the operation.

In the description given above, the arc $c$—$c$ has been assumed to pass through the first electrode 1. It is desired to point out, however, that the important condition for obtaining desired results is only that the arc $c$—$c$ have electrode 2 as its center; whether the arc passes through electrode 1 or passes beside it is of secondary importance.

I claim:

1. In a method of mapping subsurface earth structures, the steps which comprise producing a current flow between two fixed electrodes widely spaced in an area to be explored, and determining the potential difference per unit of current flow between at least two more closely spaced movable electrodes spotted at various points on the arc of a circle passing through or adjacent to one of said fixed electrodes, said arc having the other of said fixed electrodes as a center so that electrical conditions along the arc may become as independent as possible of conditions at the fixed electrode used as a center for said arc.

2. A method of mapping subsurface earth structures according to claim 1, in which the movable electrodes are spotted and spaced a predetermined distance on said arc.

3. A method of mapping subsurface earth structures according to claim 1, in which the two movable electrodes are so spaced on said arc that the distance between them is substantially the same as the distance between the nearest fixed electrode and the first of said movable electrodes.

4. A method of mapping subsurface earth structures according to claim 1, in which the movable electrodes are moved from position to position on said arc and the potential difference per unit of current flow between the movable electrodes is determined for each of said positions.

5. In a method of mapping subsurface earth structures, the steps which comprise producing a current flow between two widely spaced fixed electrodes in an area to be explored, and determining the potential difference per unit of current flow between at least one set of two more closely spaced movable electrodes located equidistantly from one of said fixed electrodes, said movable electrodes being located in the area to be explored where electrical conditions are substantially independent of electrical conditions at the fixed electrode from which the movable electrodes are equidistantly located.

6. A method of mapping subsurface earth structures according to the preceding claim, in which the two widely spaced fixed electrodes are not moved during the investigation of a given area, the movable electrodes however being moved from position to position always within the influence of one fixed electrode and not the other fixed electrode.

In testimony whereof I affix my signature.

KARL SUNDBERG.